United States Patent
Miller

(10) Patent No.: US 7,442,423 B2
(45) Date of Patent: Oct. 28, 2008

(54) HARD SURFACE-VENEER ENGINEERED SURFACING TILES

(75) Inventor: Robert J Miller, Dalton, GA (US)

(73) Assignee: Shaw Industries Group, Dalton, GA (US)

( * ) Notice: Subject to any disclaimer, the term of this patent is extended or adjusted under 35 U.S.C. 154(b) by 860 days.

(21) Appl. No.: 10/423,881

(22) Filed: Apr. 28, 2003

(65) Prior Publication Data

US 2004/0213946 A1    Oct. 28, 2004

(51) Int. Cl.
*B32B 3/00* (2006.01)
*B32B 3/14* (2006.01)
*B32B 7/02* (2006.01)

(52) U.S. Cl. ............ 428/57; 428/49; 428/88; 428/96; 428/325; 428/410; 428/212; 428/220; 52/390; 52/391; 52/392

(58) Field of Classification Search ........ 428/57, 428/49, 88, 96, 325, 410, 212, 220; 52/390, 52/391, 392

See application file for complete search history.

(56) References Cited

U.S. PATENT DOCUMENTS

| | | | |
|---|---|---|---|
| 623,923 A | 4/1899 | Molle et al. | |
| 636,200 A | 10/1899 | Frink et al. | |
| 680,468 A | 8/1901 | Sierer et al. | |
| 850,274 A | 4/1907 | Staples | |
| 2,882,714 A | 4/1959 | Gagle et al. | 72/25 |
| 2,999,431 A | 9/1961 | Mitchell | 94/13 |
| 3,287,203 A | 11/1966 | Elmendorf | |
| 3,548,559 A | 12/1970 | Levine et al. | 52/619 |
| 3,554,850 A | 1/1971 | Kuhle | 161/38 |
| 3,625,807 A | 12/1971 | Beemer | 161/38 |
| 3,657,852 A | 4/1972 | Worthington et al. | 52/591 |
| 3,694,983 A | 10/1972 | Couquet | 52/384 |
| 3,770,536 A | 11/1973 | Haigh | 156/71 |
| 3,878,030 A | 4/1975 | Cook | |
| 3,900,644 A | 8/1975 | Sackoff et al. | 428/40 |
| 3,940,528 A | 2/1976 | Roberts | 428/161 |
| 3,988,187 A | 10/1976 | Witt et al. | 156/71 |
| 4,055,451 A | 10/1977 | Cockbain et al. | 156/89 |
| 4,218,496 A | 8/1980 | Savignac | |
| 4,242,390 A | 12/1980 | Nemeth | 428/47 |
| 4,248,922 A | 2/1981 | Shortway et al. | 428/159 |
| 4,307,140 A | 12/1981 | Davis | 428/86 |
| 4,339,489 A | 7/1982 | Barker et al. | 428/167 |
| 4,554,769 A | 11/1985 | Fujii et al. | 52/173 R |
| 4,796,402 A | 1/1989 | Pajala | 52/390 |
| 4,832,995 A | 5/1989 | McLauchlin | 428/49 |
| 4,840,825 A | 6/1989 | Aristodimou | 428/77 |
| 4,931,331 A | 6/1990 | Owens | 428/47 |
| 5,062,913 A | 11/1991 | Owens et al. | |
| 5,182,892 A | 2/1993 | Chase | |
| 5,208,086 A | 5/1993 | Owens | 428/47 |
| 5,226,402 A | 7/1993 | Marocco | |
| 5,295,341 A | 3/1994 | Kajiwara | 52/586.2 |
| 5,314,554 A | 5/1994 | Owens | 156/154 |
| 5,401,343 A | 3/1995 | Owens | 156/89 |
| 5,437,934 A | 8/1995 | Witt et al. | 428/537.1 |
| 5,438,809 A | 8/1995 | Ehrlich | 52/390 |
| 5,502,939 A | 4/1996 | Zadok et al. | 52/309.9 |
| 5,605,141 A | 2/1997 | Bilotta | |
| 6,006,486 A | 12/1999 | Moriau et al. | |
| 6,247,286 B1 | 6/2001 | Heyns | 52/589.1 |
| 6,343,451 B1 | 2/2002 | Chih et al. | |
| 6,363,677 B1 | 4/2002 | Chen et al. | 52/586.1 |
| 6,401,415 B1 | 6/2002 | Garcia | 52/311.1 |
| 6,408,584 B1 | 6/2002 | Rodriguez | 52/390 |
| 6,413,618 B1 | 7/2002 | Parker et al. | 428/195 |
| 6,460,303 B1 | 10/2002 | Pacione | |
| 6,490,836 B1 | 12/2002 | Moriau et al. | |
| 6,517,915 B1 * | 2/2003 | Banus | 428/15 |
| 6,659,097 B1 | 12/2003 | Houston | 125/12 |
| 6,803,110 B2 * | 10/2004 | Drees et al. | 428/423.7 |
| 6,823,638 B2 | 11/2004 | Stanchfield | 52/588.1 |
| 2001/0029716 A1 | 10/2001 | Schnabel et al. | 52/389 |
| 2002/0100231 A1 | 8/2002 | Miller et al. | |
| 2002/0148185 A1 | 10/2002 | Garduno | 52/390 |
| 2003/0029117 A1 | 2/2003 | Moriau et al. | |

FOREIGN PATENT DOCUMENTS

| | | |
|---|---|---|
| EP | 0 123 136 A2 | 10/1984 |
| EP | 0 246 856 A2 | 11/1987 |
| GB | 2 117 813 | 10/1983 |
| WO | WO 79/01149 | 12/1979 |
| WO | WO 91/05929 | 5/1991 |
| WO | WO 02/058924 | 1/2001 |
| WO | WO 02/48477 | 12/2001 |
| WO | WO 02/055810 | 7/2002 |
| WO | WO 02/075074 | 9/2002 |

* cited by examiner

*Primary Examiner*—Keith D. Hendricks
*Assistant Examiner*—Lawrence D Ferguson
(74) *Attorney, Agent, or Firm*—Ballard Spahr Andrews & Ingersoll, LLP

(57) ABSTRACT

Engineered tile panels incorporating a hard surface veneer formed from ceramic, glass, and stone layer affixed to the core or substrate which may be assembled gluelessly and which provide uniform grouting gaps upon assembly, is disclosed along with methods therefore.

11 Claims, 2 Drawing Sheets

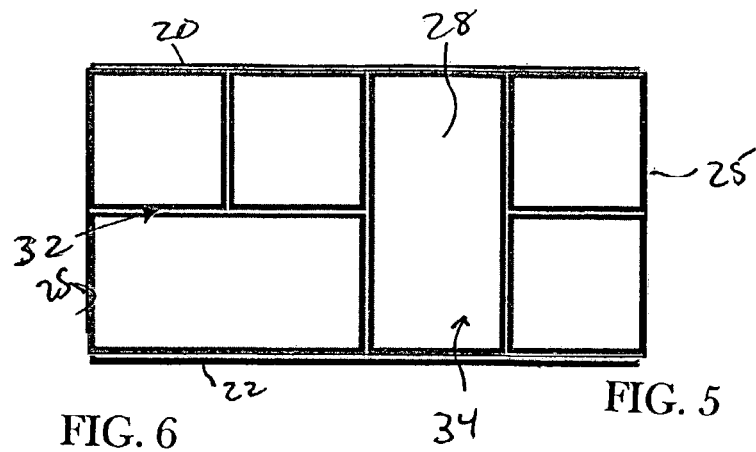
FIG. 5
FIG. 6
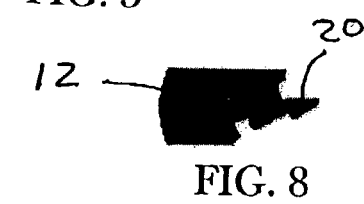
FIG. 8
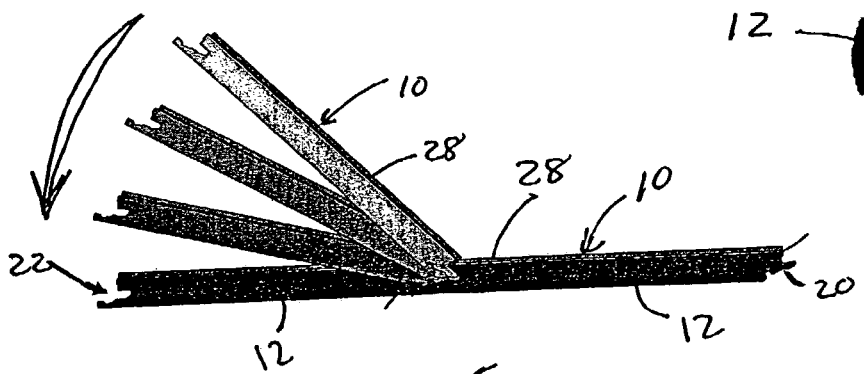
FIG. 7
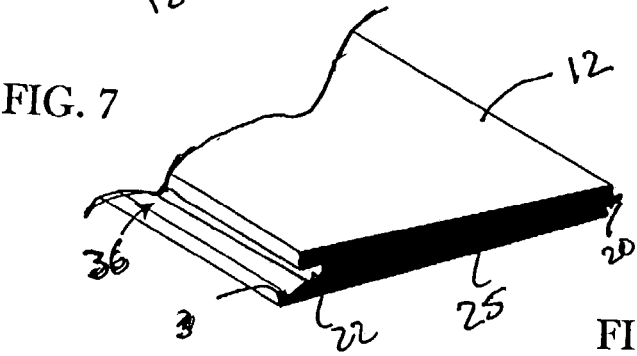
FIG. 9
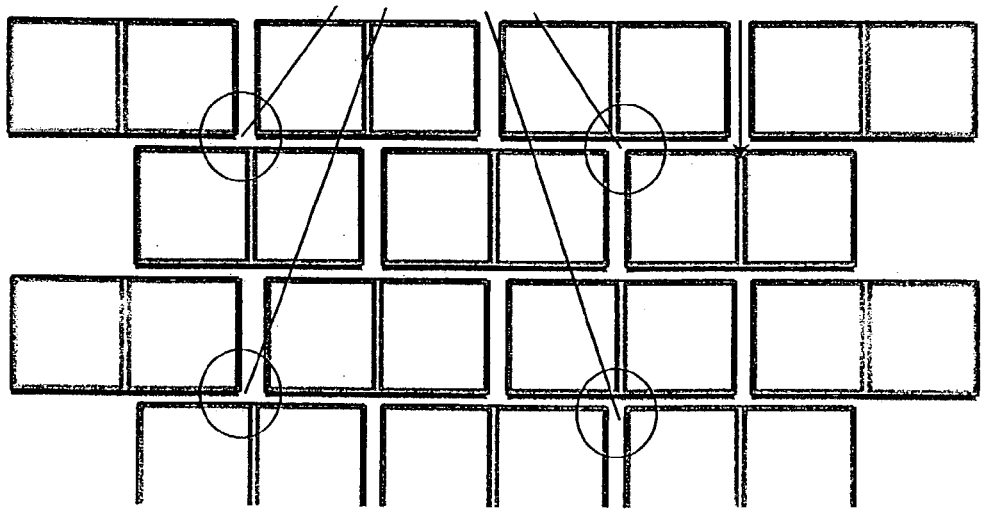

HARD SURFACE-VENEER ENGINEERED SURFACING TILES

FILED OF THE INVENTION

This invention relates to engineered, veneer, hard surface tile panel for architectural use and particularly in flooring applications. More specifically, the invention relates to pre-sized panels with a substrate on which is laminated a hard surface layer of ceramics, porcelains, marbles, granites or stone.

BACKGROUND OF THE INVENTION

Laminated constructs for structural and decorative use in the building and home improvement trades is now widely accepted throughout the industry for a wide range of applications. Notably, laminated engineered wood flooring is now replacing conventional, natural wood flooring due to enhanced uniformity, durability, and appearance while facilitating installation and maintenance. Such flooring typically features a substrate/core (base) onto which a decorative/wood grain upper layer is laminated. As the engineering and designs improve for such laminated flooring, attributable to the evolution of improved core/base structures and wood or patterned veneered surfaces, the more widespread the engineered flooring has become. However, such laminated wood structures exhibit limitations in use, particularly restricting use to interior applications in dry areas of the home. In other words, moisture in a bathroom or kitchen may cause damage to such flooring by, for example, inducing separation of the laminated upper layer from its underlying core.

Even the hardest hardwood/wood laminate flooring products with the most durable finishes (highest on the Janka scale) do not remotely approximate the strength and performance of ceramics, glass, or natural stone such as marble and granite. Moreover, unlike tile or polished stone, hardwoods must be sealed periodically to provide a surface finish protecting against penetration of moisture by the otherwise naturally absorptive wood surface. Even typically more durable engineered wood laminate flooring, suffers from water/moisture damage because no glue or other moisture resistant filler is applied between each board, plank or square. Thus, moisture can penetrate into and be absorbed by the joint area and or sub-floor.

Moisture separation of common laminates is exhibited, for example, in Formica® countertops where heating and moisture cycles induce separation of the plastic layer from the underlying supporting base. Furthermore, notwithstanding the best efforts of the designers and artists of certain imitation hard materials, e.g., marble, granite, ceramic, the simulated ceramics, marbles, granites and/or stones do not truly replicate the look and feel or durability of the authentic product. Consequently, such laminates are not only susceptible to damage and wear which necessitates refinishing and or replacement within much shorter life cycles than other building material products like brick, ceramics or natural stones, but, simply put, they are clearly artificial.

Ceramics, marble, granite and stone are preferred for durability and beauty. Ceramic tiles and natural stone provide durable surfaces with a wide range of sizes from small mosaic tiles (e.g. 1 cm.×1 cm.) to meter by meter slabs. The natural colorings, unique textures ranging from smooth high gloss to rough non-skid slate type finishes, provide the designer/architect with endless appearance options. It is also well recognized, from archeologists to builders, that natural stone and ceramic tiles also are extremely resistant to environmental changes such as climate and humidity. They can withstand variations in temperature from well below freezing to extremely high, ambient temperatures such as those experienced at hot springs. Correspondingly, such materials are generally impervious from humidity changes and handily survive in the most arid conditions to the most humid conditions, and more significantly, changes in ordinary ambient humidity, e.g., from 20% to 100%.

One well-known and costly disadvantage of using ceramic and natural stone tiles is the degree of complexity in installation, installation expertise, installation companion materials and surface preparation required to successfully complete the installation process. In the case of modern home construction and remodeling, flooring is typically installed over wood sub floors. Such sub-floors regularly require reinforcement in order to limit the amount of deflection or movement the base floor will allow. Additional layers of reinforcing plywood or cementitious sheets must be glued and fastened first. Without additional joist and/or truss reinforcement to firmly support the new flooring, the degree of deflection of the sub-floor will compromise the integrity of the upper floor.

Conventional installation of tile contemplates individual sizing, complex grinding/cutting, and careful layout on the prepared floor. The time-honored approach to achieve proper installation is to create a visible reference grid and following the grid lines throughout the installation process to preserve tile alignment. The next step requires mixing large amounts of cement materials, about 1-4 pounds per square foot of tile to be installed, followed by spreading this cement material, typically by hand, to obtain a desired thickness/proportion on the upper surface of the sub-floor. Each tile is then manually positioned and aligned according to the reference grid. As such, the installation process is both labor and time intensive and costly. In modern practice, installation by an experienced craftsman will average about 10-20 sq ft per hour maximum.

Sizing of specific tiles to conform to requirements of the installation is achieved by use of a wet saw which requires water for blade cooling and cleaning during the cutting process, where, for example, a tile must be shaped or reduced in size to accommodate an obstruction (pipe) or stationary fixture. Users of wet saws know that they do not provide flexibility found in smaller skill and power saws more traditionally used in the building materials industry. Once the tiles have been set on the cement, they must be undisturbed to cure/dry for 12 to 24 hours during which temperatures must remain above about 52° F. (11° C.). After the tiles have set for an appropriate time, the excess cement is removed, any spacers/spacing adjuncts removed and debris cleaned away. If properly laid out, the spacing between adjacent tile will possess a degree of uniformity which is filled by application of a grout of a preferred color, typically a dyed cementitious composition, in the spaces between the tiles. After the grout dries, any residue is cleaned from the tile surfaces. Typically, the grout is allowed at least one full day of setting/drying time (without traffic). Conventional cemetatious grout is known as the weakest and least durable portion of a tile floor as it is prone to failures such as cracking from movement or settling of the substructure and or tile as well as staining and discoloration from normal use and traffic. Likewise, conventional grout is notoriously difficult to maintain and clean due to its porosity and rough texture. The foregoing problems and issues clearly show that conventional tile/natural stone flooring is subject to both structural failures and or installation difficulties that may result in cracked or loose tiles and/or grout. Furthermore, installation requires considerable time and skill.

Further, significant issues associated with natural stone and ceramic products concern transport, storage and handling. In all cases, conventional tiles/flooring stone, e.g., marble or granite, are notoriously expensive to ship and store due to their natural weight and packing requirements. Handling such materials is also expensive due to the weight and fragility of larger tiles. Another significant problem associated with shipping, for example, pre-sized marble tiles, is the cost for packaging and protection of the content against chipping and breakage. Where such tile products are cut/processed/manufactured, for example, in Italy, the tiles must be carefully secured in packaging designed for shipping by both land vehicles and containers.

SUMMARY OF THE INVENTION

It is an object of the present invention to provide a novel engineered tile structure that overcomes problems associated with conventional ceramic/natural stone tile manufacture, handling, shipping and installation.

It is another object of this invention to overcome the above-identified problems of the prior art.

Still another object of the invention is to satisfy the long felt but unsolved need for natural ceramic and stone flooring tiles to have a capability for universal use and application.

Yet another object of the invention is to provide a durable, strong, stable, relatively lightweight, integrated flooring tile formed with a veneer surface of a natural stone product or ceramic affixed to a core.

A further object of the invention is to provide hard surface natural stone or ceramic veneer engineered flooring tiles permitting ease of installation and predictability of performance.

These and other objects of the invention are satisfied by an engineered floor tile comprising a generally planar base of selected dimensions and configuration, said base including an upper surface, a lower surface, a first edge incorporating a first cooperating element of an interlocking member, and a second edge incorporating a second cooperating element of said interlocking member, a veneer layer having a Mohs hardness of greater than 4 and a thickness of between 2 and 8 mm affixed to said upper surface of said base being dimensioned so as not to overlie said first cooperating member.

Other objects of the invention are satisfied by matable engineering tiles where each tile comprises a relatively rigid and generally planar core having a thickness of between 4 and 12 mm, said core defining upper and lower surfaces and at least a first and a second edge, said first edge incorporating a first cooperating element of an interlocking member, and said second edge incorporating a second cooperating element of said interlocking member where engaging said first and second cooperating elements establish said interlocking member; an upper veneer surface layer having a generally planar configuration conforming to that of the upper surface of the core and being composed of material having a Mohs hardness greater than 3 and a thickness of between 2 and 10 mm affixed to said upper surface of said upper core surface.

Still other objects of the invention are satisfied by engineered tiles comprising a stable, substantially rigid, generally planar substructure sheet having a thickness of between 4 and 10 mm and defining an upper and lower surface of a select geometric configuration, said sheet defining at least a first and a second edges where the first edge features a tongue structure projecting therefrom in a plane generally parallel to the upper core surface and said second edge including a groove recess corresponding in shape and dimension to the tongue-like structure of the first edge, where inserting said tongue structure of said first edge into the groove structure of said second edge interconnects abutting engineered tiles. A veneer layer is affixed to said upper surface of said sheet, said veneer layer being composed of a material selected from the group consisting of sliceable natural stone, marble, granite, slate, and ceramics, where said veneer has a thickness of 3-10 mm and possesses a Mohs hardness of at least 3.

Further objects of the invention are satisfied by a structure and method establishing uniform spacing between the panel/tile veneered surfaces that provide uniform grout gaps throughout the flooring installation.

Other objects of the invention are satisfied by a tile/panel structure that is easily sized using standard cutting saws to conform to installation requirements.

Still further objects of the invention are satisfied by stone/ceramic veneered tile/panel structures of less fragility and lighter weight than standard tiles and which provide substantially equal performance and appearance to standard tiles.

The invention also satisfies additional objects by providing structures and methods for glueless surface installation of engineered tiles in a minimum of time with a minimum of cost where the finished surface covering is both secure and durable as well as providing a professionally installed appearance.

In brief, the present invention provides a novel engineered tile panel structure and method substituting for conventional ceramic tile/stone/marble/slate slab construction. The invention overcomes the deficiencies of the known systems and structures and is particularly suited for use as flooring.

The invention comprises glass-tile/ceramic-tile/marble/granite/stone veneered surface material of reduced thickness (thinner dimension) than conventional surfaces traditional use (between 3 and 8 mm in thickness) which is laminated through an adhesive bonding process to a core substructure or panel. The substructure or core, in a square or rectangular configuration, preferably incorporates, along two of the opposing edges, a profiled structure contemplated for interlocking the abutting and confronting tile edges together where the veneer layers are separated by a grout gap of defined width. The profiling may be in the form of a traditional tongue or groove or may incorporate more sophisticated interlocking profiles such as those disclosed and described in U.S. Pat. Nos. 6,006,486 and 6,490,836, (Moriau et al/Unilin Beeher B V) which for those disclosures are incorporated herein by reference. Preferably, the veneer edges along the non-interlocking panel edges include a pre-defined gap to allow for fixed dimensional spacing between the panels corresponding to the grout gap spacing of the interlocking edges. As contemplated, the non-interlocking edges are conformed so that the use of glue or adhesive along the seams thereof, is optional and dependant on the environment. (Application of a waterproof adhesive along the seam in a bathroom floor installation may be desirable.)

As used herein "Stone" means marble, granite, limestone, slate, or other cuttable/sliceable natural stone materials.

As used herein "Ceramic" means monocuttura ceramic, porcelain ceramic, or multi-casted ceramic processed material. Ceramic embraces natural materials pressed from clays and other natural raw materials into a shape and then fired in a kiln to harden. These materials can be manufactured through known industry processes like Monocuttura (meaning single fired), Monoporosa (single fired wall tile process), Porcelain (lower porosity body which can be glazed or unglazed to achieve the desired aesthetic or structure effect) or casting (multicasting and other similar methods of wet slurry sheet type process). Ceramic production pressing processes are primarily used for the production of 'Porcelain' and single firing 'Monocottura' (once fired) floor tiles. These processes dominate worldwide ceramic tile production.

As used herein "Porcelain" means a category of ceramic belonging to the general classification and group of low or non-porous materials, with or without glaze. Typically, porosity ranges from 3% absorption in the body to nearly zero or completely vitrified; (water absorption<to 0.1%) defining a product as fluid impervious and frost resistant. The surface hardness of porcelain ceramics typically exceeds a rating of 5 on the Mohs mineral hardness scale and the material typically exhibits a breaking modulus greater than 10 N/mm$^2$ and preferably greater than 30 N/mm$^2$. (The higher the breaking strength, the better the crack resistance.)

Present porcelain tile typology categories include plain colors, small grain mixtures of various colours that are composed of at least two varying grains all of equal size or of various diameter. The porcelain may incorporate elaborations with powder dust-pressing mixtures of various colors and shapes obtained by application during the pressing phase, surface decorations of various colours and shapes obtained by salt and/or oxide serigraphic applications.

As used herein Mohs Hardness possesses its conventional meaning. The Mohs Scale, numerically identifies materials by hardness based on standard minerals, from 1 (softest) to 10 (hardest) as follows: Talc, Gypsum, Clacite, Fluorite, Apatite, Orthoclase, Quartz, Topaz, Corundum, and Diamond.

As used herein, Janka hardness, means the measure of the hardness of woods in pounds per square inch. Examples of Janka hardness of woods, which have a Mohs rating of less than 1 range from the hardest, Brazilian ebony (Janka Hardness of 3692), through oak (white and red) 1360 and 1260 respectively, to the soft woods such as pine with a rating of 690.

As used herein "connected" includes physical, whether direct or indirect, permanently affixed or adjustably mounted. Thus, unless specified, "connected" is intended to embrace any operationally functional connection.

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to the accompanying drawing, and which is shown by way of illustration to the specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

Given the following detailed description, it should become apparent to the person having ordinary skill in the art that the invention herein provides a novel engineered tile and method permitting exploitation of significantly augmented efficiencies while mitigating problems of the prior art.

BRIEF DESCRIPTION OF THE DRAWINGS

FIG. 5 is a top view of an assembly of another panel comprising six engineered tile veneers in accordance with the invention where the tile veneers are of different sizes.

FIG. 6 is a representational side view of interlocking two engineered tiles using a profiled tongue and groove locking system.

FIG. 7 is a perspective view of an elongated tile according to the invention illustrating a non-interlocking edge FIG. 8 is an enlarged view of a tongue locking profile according to the embodiment of the invention depicted in FIG. 6.

FIG. 9 is a top assembly view of a staggered tile array of a further embodiment of the invention.

DESCRIPTION OF THE ILLUSTRATED EMBODIMENTS OF THE INVENTION

Figure 1:
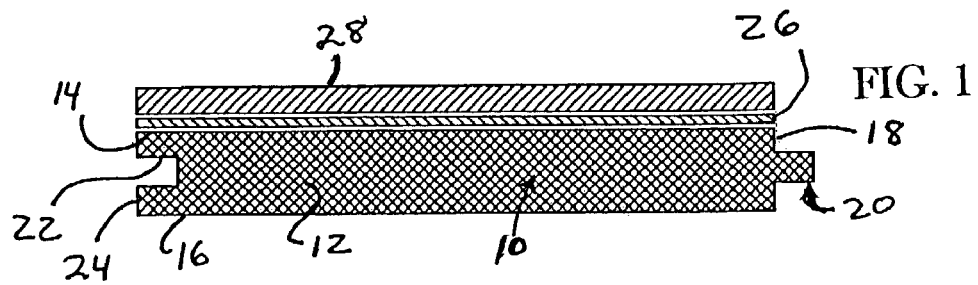
FIG. 1 is a cross-sectional view of an engineered tile panel according to one embodiment of the invention.
Figure 2:
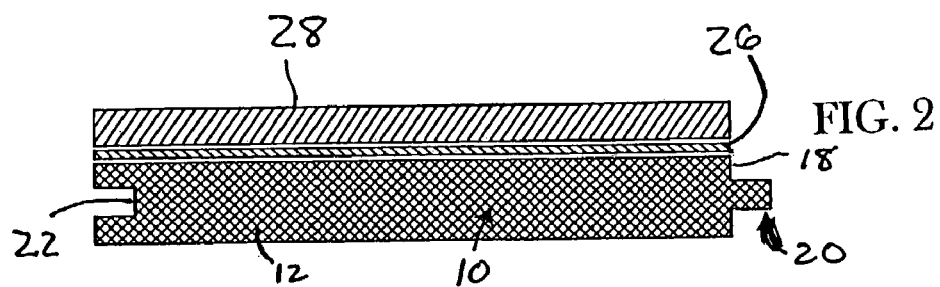
FIG. 2 is a cross-sectional view of an engineered tile panel according to an alternative exemplary embodiment of the invention.

Referring now to the detailed drawings, in which like reference numerals indicate like parts throughout the multiple views, two preferred embodiments of an engineered tile panel of the invention are illustrated in FIGS. 1 and 2. The hard surface, veneered tile panel 10 is a unitary, laminated, planar member that does not require secondary reinforcement material backing. The tile panel 10, in the illustrated embodiment has a fiberboard core or base 12 which includes a generic tongue profile 20 projecting medially between the upper planar surface 14 and the lower planar surface 16 of the coreboard along the edge 18 of the coreboard 12. The tongue profile may be discontinuous but preferably is coextensive with the edge 18. A groove 22 is disposed along the opposite edge 24 and is dimensioned to receive and interlock with the tongue profile 20. The coreboard thickness ranges from 4 to 12 mm so that the laminated panel tile 10 conforms in thickness to conventional ceramic and stone tile thickness.

The coreboard 12 typically is composed from a processed wood or paper material. A preferred coreboard material is 6.8 mm HDF (High density Fiberboard) which exhibits appropriate resistance to bending or bowing suitable for most flooring applications. It should be readily apparent that if cost is not an issue, the laminated hard surface tile of the instant invention may be formed from materials possessing equivalent or superior rigidity, strength, and flexibility properties to those of HDF such as certain metal or synthetics which exhibit relatively dimensional stable base for the intended service environment of the installed engineered panels.

The upper surface 14 has disposed thereon a thin layer of an appropriate water impervious adhesive 26 typically ranging from 0.05 to 0.75 mm in thickness but preferably about 0.2 mm. The adhesive layer 26 secures the veneer surface 28 to the upper coreboard surface, and, thus, the coreboard 12. However, the adhesive must possess some flexibility to reduce risk of loss, particularly during transport and or handling damage to the finished veneer and or the bond of the finished veneer to the core. Compensating for some movement is also preferred to minimize damage associated with natural movement and substructure movement or deflection inherent in most building materials and design structures.

The veneer surface 28 is formed from a relatively thin layer of natural stone, processed stone, ceramic, or glass having a Mohs hardness of from 3 to 8 and a thickness of from 2 to 8 mm depending on the particular material comprising the veneer. In FIG. 1, a veneer with a thickness of 3 mm is illustrated while in FIG. 2, the veneer is 8 mm. The veneer may extend across the entire upper coreboard surface but preferably is recessed by a predetermined space to form pre-established, uniform 0.0125 inch (3.17 mm) grouting gaps 30 between veneers 28 on adjacent tiles. The veneers may be beveled, preferably about 1 mm, along the upper peripheral edges to provide for a generally smooth, uniform finish.

Figure 3:
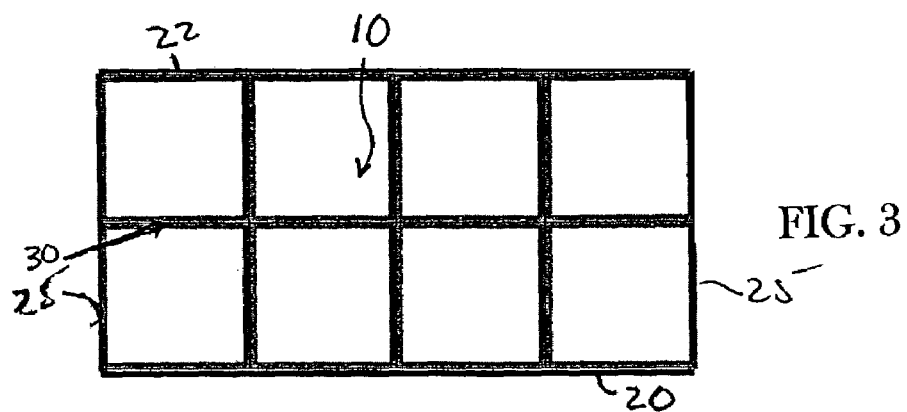
FIG. 3 is a top view of an assembly of eight, square, engineered tiles in accordance with the invention.
Figure 4:
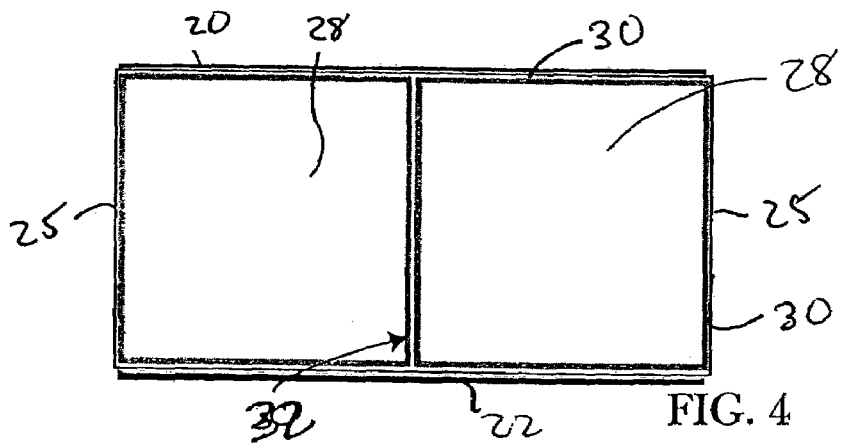
FIG. 4 is a top view of an assembly of a panel comprising a pair of square, engineered veneer surfaces in accordance with the invention.

FIGS. 3 through 5 illustrate top views of the veneer tiles and panels composed of two or more tiles. FIG. 3 depicts veneer tiles assembled in a conventional four-square arrangement using 6×6 inch (15.2 cm$^2$) tiles. The tiles each feature the profiled (tongue and groove) features disposed along two opposite edges and include two non-profiled end-abutting edges 25. The grout gap border is established by the specific sizing and placement of the veneer 28 affixed to the coreboard 12. The veneer 28 is dimensioned to recess approximately 1/16 inch (1.5 mm) from the edge of the coreboard 12 and set on the coreboard in a manner to provide the pre-engineered grout gap. As can be observed from this arrangement, the tiles incorporate a substantially uniform 1/8 inch grout gap border 30 (scale exaggerated in the drawing). It should be readily appreciated that where a design is intended to have a non-uniform effect, e.g., a rustic/antique look, the grout gap 30 may be engineered to provide an intentionally non-uniform appearance.

Machining of the veneer must replicate the intended configuration for the tile so that it or the intended combination of several such tiles conforms to the underlying base 10. The individual veneer layer may be of any desired shape or size. However, the preferred polygonal form is a quadrilateral, either a square or rectangular. The hard-surface veneer contemplated by the present invention is permitted some variation but such variations must fall within a small range of tolerances in order to preserve the uniform appearance of the finished floor and to maintain structural integrity. Consequently tolerances in length and width should not exceed about 2/100 inch (0.5 mm). Veneer thickness variations should not exceed 2%.

The adhesive layer, preferably of a waterproof composition, is disposed on the upper surface 14 of the panel 10 by deposition of a uniform bead or doctored layer of quick drying/activated adhesive, hot glue, and the like and receives the veneer 28. PUR (Polyurethane Resin) is the preferred adhesive in this application. The layer 26 is applied to the top of the panel using spray nozzle type application with no greater than 1 inch in bead spacing to create a surface bond of at least 60% coverage between the core 12 and veneer 28. In addition to possessing water resistance, PUR glue or adhesive should exhibit some elasticity/flexibility to allow the substrate panel to independently change in dimension or twist and or bend greater than 2 mm per lineal foot without severing or causing failure to the bond between the veneer and the panel.

FIG. 4 depicts a rectangular panel (a single coreboard) having mounted thereon a pair of inventive veneers 28. As in the case of the embodiment of FIG. 3, the veneers 28 include a 1/16 inch peripheral border grout gap 30 but it also features an integrally formed 1/8 inch grout gap 32 extending between the two tile veneers 28. It should be readily appreciated that the depth of the grout gap corresponds to the thickness of the veneer and any contribution from the underlying adhesive 26 on the coreboard 12. The grouting material used in connection with this invention preferably is flexible, possesses permanent elasticity, and be essentially water/fluid impervious after curing.

The grouting material should meet or exceed ASTM C-920, Class 25, Class A requirements for elastomeric joint filler. Thus a material may be a cured single-component or multi-component cold-applied elastomeric joint sealant that is used for sealing clay and stone base products in residential and commercial applications. Although the sealant/grout must be waterproof after curing, to meet this standard, it must be a latex based (water soluble) material which provides ease of flow during application and be cleanable/dissovlable in water before curing. Preferably, the grout is supplied in a caulking tube form to simplify installation. Moreover, the preformed "plastic grout" can incorporate a range of pre-mixed colorants to provide a coordinated appearance while exhibiting permanent flexibility, non-porosity, adequate adhesion, and weather and mildew resistance that yields a relatively non-porous surface which facilitates maintenance.

FIG. 5 depicts a variation of a single, rectangular panel 34 according to the invention which has a total of six veneer tiles of two different sizes, arranged in a pre-set pattern. The panel 34, as above, incorporates a peripheral border grout gap 30 as well as "internal" 1/8 grout gaps 32. The rectangular periphery of the panel 34 includes a tongue 20 and a groove 22 (profiling) formed along the opposing long edges thereof and a pair of non-profiled edges 25 adapted for direct abutment with coreboards of adjacent panels.

FIG. 6 represents installation of a tile 10 with an adjacent tile 10 in accordance with the invention where the tongue and groove profiles correspond to the those disclosed in U.S. Pat. Nos. 6,006, 6,490,836 and particularly the discussion relating to the structure depicted in FIG. 22 of the those patents for glueless flooring installation. The profile tongue and groove are provided with locking elements which, in engaged condition with the panels in a common plane, exert a tension force upon each other, as a result of which the engaged panels 10 are forced towards each other in compression. (See also FIGS. 7 and 8). As understood, this behavior is achieved by providing the coupling parts with an elastically yieldable or bendable portion, in this case the groove's 22 lower lip 36, which, in engaged condition, is at least partially bent and in this way creates a tension force which results in the adjacent panels 10 being forced towards each other. FIG. 9 shows an assembly view of multiple panels of the type depicted in FIG. 4 with staggered alignment, e.g., installation without creating a four-panel corner intersection.

Where installation requires cutting one or more of the tile/panels 10 conventional measuring and marking of the desired cut size and or shape followed by cutting with a conventional skill or table saw, preferably equipped with an electroplated diamond tipped blade, yields the desired cut to size piece needed for the application. This process is much easier than traditional ceramic and stone cutting which requires a large wet type saw and cutting process. Not only is the use of such equipment less convenient and more costly, technically, wet saws do not posses the range of motion/directional changes that can be exercised with table/skill saws. Thus, the act of cutting the inventive tiles itself, is considerably simplified over the traditional stationary wet-saw type process.

A brief recitation concerning production of the relatively thin veneer layer 28 from stone materials, e.g., granite, marble, limestone, and slate. Such production typically requires cutting, grinding, or slicing from blocks or blanks. For such purposes, for example, stone fabrication equipment available from Pedrini, an Italian stone processing equipment manufacturer, provides marble, granite and/or stone slices from large blocks of native stone. Granite can be block sawed into strips adapted for use in the invention using a L'Arco di Trionfo M595 Modular Cutting Center. Quick sawing of marble blocks using a GS 131, a relatively new 4-column gang saw with a fixed height blade holder frame and a vertical movement block holder platform. The GS 131 type of device raises the targeted block towards the blade holder frame thereby providing high cutting frequency operations (90 cycles per minute) with very long cutting stroke (800 mm), using relatively short cutting blades. Thus, executing nearly flawless straight cuts is achievable even when working at the highest lowering speed. For granite processing, known grinding machines and techniques can be effectively employed to obtain the veneer for use in the present invention. Also multidisc cross cutting machines can be used in continuous cycle cutting of granite (as well as for softer materials).

For the foregoing, it should be readily appreciated that the inventive tiles/panels are sturdier and lighter than sheets of stone or ordinary tile. Morover, due to the overall more rugged nature of the laminated products, the risk of damage is lessened. Indeed, projections indicate upward of 50% (56.9%) less breakage from transport, handling and storage of the inventive tiles over their conventional counterparts. An even more significant cost savings provided by the instant invention over conventional hard surface (stone, glass, ceramic) materials is in transport and energy costs required therefor. By one estimate the invention provides a transport cost savings averaging in excess of 40% (46%).

Although several embodiments of the invention have been disclosed in the forgoing specification, it is understood by those skilled in the art that many other modifications and embodiments of the invention will come to mind to which the invention pertains, having benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

I claim:

1. An engineered tile, comprising:
   a generally planar base of selected dimensions and configuration, said base including an upper surface, a lower surface, a first edge incorporating a first cooperating element of an interlocking member, and a second edge incorporating a second cooperating element of said interlocking number;
   a veneer layer having a Mohs hardness of greater than 3 and a thickness of between 2 and 8 mm affixed to said upper surface of said base, said veneer layer being dimensioned so as not to overlie said first cooperating member.

2. The engineered tile according to claim 1 where the veneer is composed of a material selected from the group consisting of sliceable natural stone, marble, granite, slate, glass, and ceramics.

3. The engineered tile according to claim 2 where the veneer is a ceramic of a type selected from the group consisting of Monocuttura ceramic, Monoporosa ceramic, porcelain ceramic, or multi-casted ceramic.

4. The engineered tile according to claim 1 where the veneer has a breaking modulus greater than 10 N/mm$^2$.

5. The engineered tile according to claim 4 where the veneer has a breaking modulus greater than 30 N/mm$^2$.

6. The engineered tile according to claim 2 where the veneer is sliced and polished natural marble of a thickness of between 4 and 6 mm.

7. A flooring tile, comprising:
   A stable, substantially rigid, generally planar substructure sheet having a thickness of between 4 and 10 mm and defining an upper and lower surface of a select geometric configuration, said sheet defining at least a first and second edges where the first edge features a profiled tongue structure projecting therefrom in a plane generally parallel to the upper core surface and said second edge including a groove recess corresponding in shape and dimension to the profiled tongue of the first edge, where inserting said tongue structure of said first edge into the groove structure of said second edge interconnects abutting tiles;
   a veneer layer affixed to said upper surface of said sheet, said veneer layer being composed of a material selected from the group consisting of sliceable natural stone, marble, granite, slate, glass, and ceramics, where said veneer has a thickness of 3-10 mm and possesses a Mohs hardness of at least 3.

8. A flooring tile according to claim 7 where veneer layer is recessed from the edges of the core and comprises a plurality of discrete segments disposed on the core so as to provided uniformly spaced gaps having a depth corresponding to the thickness of the veneer combined with the adhesive and having a pre-selected width between adjacent segments for receiving and retaining grout.

9. A flooring tile according to claim 7 where the veneer has a breaking modulus greater than 30 N/mm$^2$.

10. The flooring tile according to claim 8 where the tongue and groove profile force interlocked abutting panels of abutting tiles towards each other in compression for glueless installation.

11. The flooring tile according to claim 10 where the tile is cuttable with conventional powered dry saws.

* * * * *